April 11, 1961  A. D. WISEMAN  2,979,056
DENTAL DEVICE AND METHOD
Filed Jan. 15, 1957
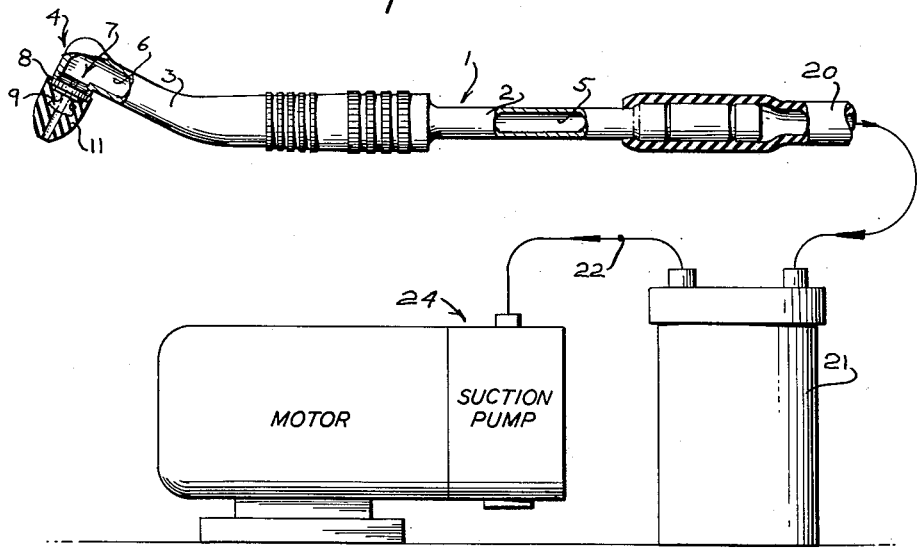
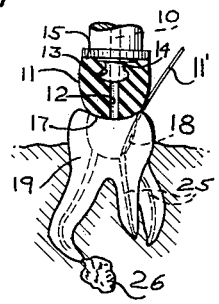
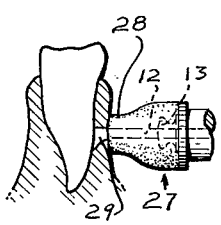
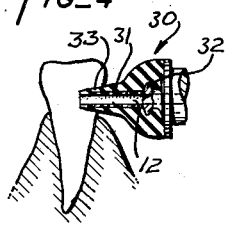
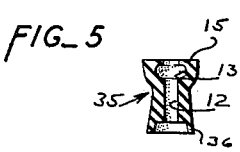
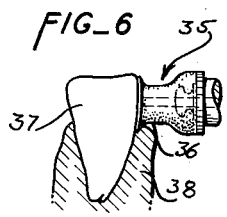
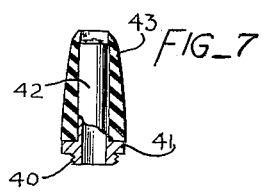
INVENTOR.
ADOLPH D. WISEMAN
BY
Boyken Mohler & Wood
ATTORNEYS United States Patent Office 2,979,056
Patented Apr. 11, 1961

2,979,056
DENTAL DEVICE AND METHOD
Adolph D. Wiseman, 1068 Mission St., San Francisco, Calif.
Filed Jan. 15, 1957, Ser. No. 634,228
1 Claim. (Cl. 128—278)

This invention relates to a dental device for use in removing undesirable material from teeth and from tissue associated therewith, and has for one of its objects the provision of means for more efficiently removing such undesirable material than heretofore, both as to time and thoroughness.

Heretofore, in the dental profession, it has been customary to employ absorptive material of some kind in an attempt to remove pus and other undesirable material from infected sites. In the case of abscessed teeth the attempt to clear the infected area or pus sac at the ends of fine, and many times, tortuous root canals, may be impossible, or may take a number of days.

In cases of alveolar pyorrhea and alveolar abscesses generally, the conventional means and methods heretofore employed for removing the purulent material are inefficient and arduous and are many times inadequate.

With the present invention and by the methods hereinafter described, root canals may be readily and thoroughly cleaned and the pus removed from the infected sites in a fraction of the time required by conventional means and methods.

An object of the invention is the provision of means adapted for use in the mouth of a person that will enable an effective partial vacuum to be applied to infected sites, many of which may otherwise be inaccessible, thereby enabling the dentist to effectively treat and to save teeth that would otherwise be lost, and which means is adapted to be used with the minimum of inconvenience to the patient.

Another object of the invention is a method of removing purulent material from an abscess at the alveolar end of the root canal of a tooth by drawing said material through said canal by application of a vacuum to the crown end of such root from a source of vacuum remote from the tooth and then collecting said material at a point between said source and said tooth for disposal thereof.

Other objects and advantages will appear in the description and in the drawings.

In the drawings:

Fig. 1 is a part sectional and part elevational view of the dental device of this invention shown in a semi-schematic system that includes a source of vacuum;

Fig. 2 is a slightly enlarged sectional view of the nozzle of the dental device as applied to the crown of a tooth having a trifid radicular or root portion;

Fig. 3 is an elevational view of a slightly different nozzle tip than is shown in Fig. 2 applied to the gum at the point of eruption of an abscess through the gum;

Fig. 4 is a sectional view taken through a slightly different nozzle than is shown in Figs. 2 and 3 showing said nozzle entered between a pair of adjacent teeth substantially at their cervical portions;

Fig. 5 is a sectional view through a still further form of nozzle tip; and,

Fig. 6 shows the nozzle tip of Fig. 5 in elevation in a position against the side of a tooth at the cervical portion with a lip of the tip disposed between the gum and tooth at said portion, and Fig. 7 shows a slightly different structure from that of Fig. 2.

In detail, the handpiece, generally designated 1 in Fig. 1, has a straight elongated handle portion 2, and an angle extension 3 at one end thereof extending at an angle to the handle.

The extension 3 terminates in a head 4 at its end remote from the handle. A continuous passageway 5 extends through said handle 2 and through said extension 3 and opens outwardly of said head at right angles to the portion 6 of the passageway that extends through said extension, said opening being directed toward the axis of the handle.

A fitting 7 in the form of an exteriorly threaded annular body may be threadedly secured within the inlet end of passageway 6, which is the open end of the passageway in extension 3 and head 4. Thus the fitting becomes part of the head or extension, although it is removable therefrom.

The fitting 7 is formed with an annular, radially outwardly projecting flange 8. The threaded end that is secured within the inlet end of passageway 6 extends from one side of flange 8, and a bulbous shaped projection 9 projects from the opposite side of said flange and outwardly of the extension. A central, open ended, through passageway 10 (Fig. 2) extends through the fitting 7 coaxial therewith, hence one open end of the passageway is in the outer end of the bulbous projection 9 and the other end is in the threaded projection, and said passageway is a continuation of the passageway 5 and 6.

Removably secured over the bulbous projection of fitting 7 is a nozzle or nozzle tip comprising a body 11 preferably of soft rubber, such as surgical rubber, but it may be of any material having substantially the same characteristics.

A structure common to all of the nozzles shown in Figs. 2 to 6 inclusive, is the fitting 7, and each of the nozzle tips has a through, open ended bore 12 that is interiorly enlarged at one end at 13 to snugly but removably receive the bulbous projection 9 of the fitting 7. The axially facing surface of the annular flange 8 that extends radially outwardly of the restricted neck 14 at the juncture between said projection and said surface, is adapted to be engaged by the flat surface 15 (Fig. 5) at the base of each nozzle tip. Thus the flat, axially facing surface of the flange forms a rigid support that cooperates with the bulbous projection to take a thrust force applied against the outer end of the nozzle tip in a direction axially of the nozzle tip and of the passageway 10 in the fitting 7. These characteristics, being common to all of the nozzles or tips illustrated, will bear the same numerals.

In the tip 11 of Figs 1 and 2, the outer surface thereof is of generally conical shape, but convexly rounded at its outer end as at 17 (Fig. 2).

In use, this nozzle tip 11, when urged in a direction axially of bore 12 against the irregular edge of a cavity 18 in a tooth 19, and against a side of the thin elongated discharge nozzle 11' of a conventional irrigating syringe, will be adequately sealed off by the tip.

The outlet end of the handle 2 of the handpiece is adapted to be connected by a flexible tube 20 with the interior of the upper end of a closed receptacle 21, and a second tube 22 also communicates with the interior of the upper end of said receptacle and between said upper end and a source of vacuum 24, which source is indicated as a motor actuated suction pump of conventional structure.

When the nozzle tip 11 is in the said sealing engagement with the edges of cavity 18 and the suction pump 24 is actuated, a liquid medicament or any other desired fluid is injected into the cavity and root canal or canals 25 through the nozzle 11' of a conventional syringe substantially of the same type as an ordinary hypodermic syringe, the said nozzle 11' being relatively thin so as to usually be capable of entering a root canal to some degree. In the event the pulp in the root canal is deteriorated and the product thereof is not liquified the liquid injected by the nozzle or needle 11' will function to loosen and free the contents of the tooth and of any pus sac or abscesses 26 (Fig. 2) so as to enable such loosened and purulent material to be withdrawn through nozzle 11 and deposited within the receptacle 21 together with liquid injected into the tooth cavity and root canal by the syringe.

The root canal or canals, and any cavities or sacs in communication therewith will be cleaned, disinfected and medicated according to the character of the fluid injected into the tooth, which steps may be performed by the present invention in a very short time and with far greater certainty and efficiency than by apparatus and methods heretofore practiced.

The soft body of the nozzle tip 11 enables it to conform readily to the contour of nozzle 11' as well as to the irregular contour of the edge of the cavity.

In Fig. 3 a nozzle tip 27 is shown, which tip has the enlarged base end in which the recess 13 is disposed, and a through bore 12 extends through the tip. However, the outer end portion 28 of the tip is generally cylindrical and of lesser diameter than the base portion. A tip of this character is useful in withdrawing purulent material from tissue such as the gum, in which a passageway 29 may have broken through the gum to relieve an infection at the tooth or in the alveolar process.

The nozzle tip 27 is preferably of soft rubber, the same as nozzle 11, so as not to injure the gum tissue. This tip can be readily manipulated so as to admit sufficient air at the outer end of the bore to create a steady flow of material through the tip, to thereby clean out the infected site within the gum.

Fig. 4 is illustrative of a tip 30 that has a through bore and an enlarged base and recess in the latter, the same as in the tip of Fig. 2. However, a thin but rigid metal extension 31 on the bulbous projection 32 may extend into the relatively thin outer end portion 33 of said nozzle so as to enable the portion 33 of the nozzle to extend between teeth and into or sufficiently close to pyorrhea pockets that are between the teeth to clear them of purulent material. The projection or extension 31 need not necessarily extend to the tip of the projection 33 since its main purpose is to stiffen the relatively thin projection, while retaining the benefits of the soft rubber.

Fig. 5 shows a nozzle tip 35 in which the outer end portion is formed with a thin axially extending lip or rim 36 in continuation of the outer surface of the nozzle tip. The sides of this rim extend slantingly outwardly relative to the axis of the nozzle in direction away from the enlarged base. Thus when the tip is pressed against a tooth 37 (Fig. 6) the rim will flatten against the tooth and may readily extend between the gum 38 and the tooth, since the gum is free from the tooth along its marginal portion. When the vacuum is applied any material that may be along the juncture between the gum and tooth will readily be removed. The degree of pressure exerted against the tooth axially of the tip will, to a great degree, determine the amount of air admitted to the nozzle.

The angle extension 3 on the handpiece is quite important in that it enables the dentist to reach the desired locations with whichever nozzle tip is used, and to use it most efficiently.

The mounting of the tips insures alignment between the bore in each and the passageway in the head 4, while the provision of the enlarged base and bulbous projection not only enables quick removal of the tip from the fitting in order to effect a quick replacement, but it provides a stable support for the outer end of the tip when the latter is pressed axially against a tooth and when the tip is moved laterally during its operation.

The fact that the nozzles are of soft surgical rubber or of material having similar characteristics insures against discomfort to the patient and injury to tender tissues and at the same time enables the tip to follow the irregular contour of any part engaged by the tip.

It is to be understood that the specific details described are illustrative of a preferred form of the invention and are not to be considered restrictive of the claims, for example, in Fig. 7 the fitting for the tooth or gum engaging body in many instances comprises a rigid tubular member externally threaded at one end at 40 for threadedly securing one end in the head 4 of the handpiece, and an annular flange 41 around said member adjacent to said threaded end is adapted to abut the handpiece, the same as is shown in Fig. 1.

Instead of using a bulbous projection, the device of Fig. 7, shows a straight sided extension 42 that may be relatively short or long, except that it preferably extends almost to the outer end of the rubber tooth or gum engaging body 43 that is adapted to fit over said projection. Any of the various forms of rubber tips illustrated may be used with this form of fitting, but it is important that the outer end of the projection terminate slightly short of the end of the passageway in which it is fitted so that a soft tooth or gum engaging outer end portion on the body 43, be provided to prevent any contact between the projection 42 and the tooth or gum, and to enable a relatively tight seal to be effected.

I claim:

A tooth and gum engageable nozzle tip for connection with a suction device for use in removing undesirable material from tooth cavities, comprising: a body of soft, resilient rubber having an open ended through bore providing an inlet at one end of said bore within which a rigid support is adapted to be held and an outlet at the opposite end of said bore, said body being relatively thick radially of said bore around its said inlet and said bore being formed with an enlargement therein adjacent to said inlet adapted to enclose such rigid support in tight engagement therewith, and outer surface of said body around and adjoining said outlet being relatively wide radially of said outlet and terminating in a thin flexible annular lip coaxial with said outlet and projecting axially of said bore, said lip being adapted to flex outwardly relative to said outlet to enable a portion thereof to seal against a tooth under the gum when said body is passed axially of said outlet against a tooth with a side of said lip at the gum line.

References Cited in the file of this patent

UNITED STATES PATENTS

| | | |
|---|---|---|
| 1,020,985 | Jones | Mar. 26, 1912 |
| 2,108,558 | Jackman | Feb. 15, 1938 |
| 2,173,637 | Riedener | Sept. 19, 1939 |
| 2,595,666 | Hutson | May 6, 1952 |
| 2,711,586 | Groves | June 28, 1955 |